United States Patent [19]
Anezaki et al.

[11] Patent Number: 5,202,171
[45] Date of Patent: Apr. 13, 1993

[54] OPTICAL INFORMATION RECORDING MEDIUM

[75] Inventors: Yoshikazu Anezaki; Koji Sasaki, both of Miyagi, Japan

[73] Assignee: Sony Corporation, Tokyo, Japan

[21] Appl. No.: 658,667

[22] Filed: Feb. 21, 1991

[30] Foreign Application Priority Data

Feb. 22, 1990 [JP] Japan .................. 2-39795
Oct. 31, 1990 [JP] Japan .................. 2-294286

[51] Int. Cl.⁵ .............................. B32B 3/02
[52] U.S. Cl. ........................ 428/64; 428/65;
428/192; 428/913; 369/277; 369/284; 369/288;
346/76 L; 346/135.1; 430/945
[58] Field of Search ............. 428/64, 65, 192, 913;
369/277, 284, 288; 346/76 L, 135.1; 430/945

[56] References Cited

U.S. PATENT DOCUMENTS 4,802,160 1/1989 Yamada .................. 369/284

Primary Examiner—Patrick J. Ryan
Assistant Examiner—W. Krynski
Attorney, Agent, or Firm—Lewis H. Eslinger; Jay H. Maioli

[57] ABSTRACT

An optical information recording medium is manufactured by a so-called photopolymerization process. The medium comprises a glass substrate and a layer of ultraviolet ray setting resin having a surface which is a replica of a stamper. Concentric recesses are formed at the outer and inner peripheral edges of the glass substrate to receive an excess resin to avoid any formation of a bur on the finished disk medium.

7 Claims, 6 Drawing Sheets

OPTICAL INFORMATION RECORDING MEDIUM

BACKGROUND OF THE INVENTION

The present invention relates to a glass substrate for an optical disk such as a digital audio disk (so-called compact disk) and a magneto-optical disk, and more particularly to a glass substrate for an optical disk to be manufactured by a so-called 2P method (photopolymerization method) in which a rugged pattern of pits and grooves is transferred onto the glass substrate by photopolymerization of ultraviolet hardening resin.

In manufacturing an optical disk such as a digital audio disk and a magneto-optical disk, a transfer process is carried out to transfer a rugged pattern of pits, such as for an address signal and guide grooves onto a disk substrate. As such a transfer process, there is proposed a so-called 2P method such that a stamper on which the rugged pattern is formed is brought into close contact with liquid ultraviolet setting resin, and ultraviolet light is irradiated to the ultraviolet setting resin to photopolymerize the same.

According to the 2P method, the liquid ultraviolet setting resin is applied to one surface of the disk substrate having a light transmissivity by screen printing, for example, and the stamper on which the rugged pattern is formed is brought into contact with the ultraviolet setting resin applied onto the surface of the disk substrate. Then, ultraviolet light is irradiated to the ultraviolet setting resin from the side of the disk substrate, thereby photopolymerizing the ultraviolet setting resin to harden the same. Thereafter, the disk substrate with a layer of the ultraviolet setting resin thus hardened is separated from the stamper. As a result, the fine rugged pattern (pits and grooves) formed on the surface of the stamper is transferred to the surface of the disk substrate.

As mentioned above, the ultraviolet setting resin in a liquid state is brought into close contact with the stamper according to the 2P method. Therefore, it is advantageous that a high fidelity of duplication can be obtained and that the stamper is hardly deteriorated. Particularly in the case that a glass substrate is used as the disk substrate, it is greatly advantageous from the viewpoints of dimensional stability, heat resistance and low double refraction.

In applying the ultraviolet setting resin to the entire surface of the glass substrate, there is a possibility of spewing of the resin or generation of bubbles. Accordingly, the application of the ultraviolet setting resin is carried out using screen printing employing a printing pattern set so as to ensure uniform spread of the resin and eliminate the problem of spewing, etc.

However, even though the ultraviolet setting resin is applied with the desired printing pattern for the purpose of preventing the spewing of the resin or the generation of the bubbles, there is a possibility that an excess part of the ultraviolet setting resin is spewed from inner and outer circumferential portions of the glass substrate in the step of bringing the resin into close contact with the stamper. If such a spewed part of the resin is left as it is, it will be hardened by the ultraviolet irradiation in the next step. As a result, the spewed resin thus hardened remains as a bur. The generation of such a bur hinders recording and reproduction particularly in case of a magnetooptical disk to be accommodated in a cartridge, thus causing a reduction in yield.

OBJECT AND SUMMARY OF THE INVENTION

Accordingly, it is an object of the present invention to provide an improved optical information recording medium having a glass substrate and an ultraviolet ray hardened resinous layer on a major surface of the substrate.

It is another object of the present invention to provide an optical information recording medium which can prevent the spewing of excess ultraviolet setting resin upon forming the UV setting resinous layer to thereby eliminate the generation of a bur. It is further object of the present invention to provide an optical information recording medium improved in production yield.

According to one aspect of the present invention there is provided an optical information recording medium which comprises a disk shaped glass substrate having a center hole with a recess formed in the vicinity of an outer circumferential edge and/or an inner circumferential edge of said glass substrate, an ultraviolet ray hardened resinous layer formed on said substrate, an edge area of said ultraviolet ray hardened resinous layer being terminated at said recess, and optical information formed on said resinous layer.

BRIEF DESCRIPTION OF THE DRAWINGS

FIG. 3(a) to 3(d) are enlarged sectional views showing some preferred shapes of the recess, wherein

FIGS. 5(a) to 5(f) are schematic perspective views showing a series of steps for manufacturing an optical disk by the 2P method, wherein

DESCRIPTION OF THE PREFERRED EMBODIMENTS

There will now be described a preferred embodiment of the present invention.

Figure 1:
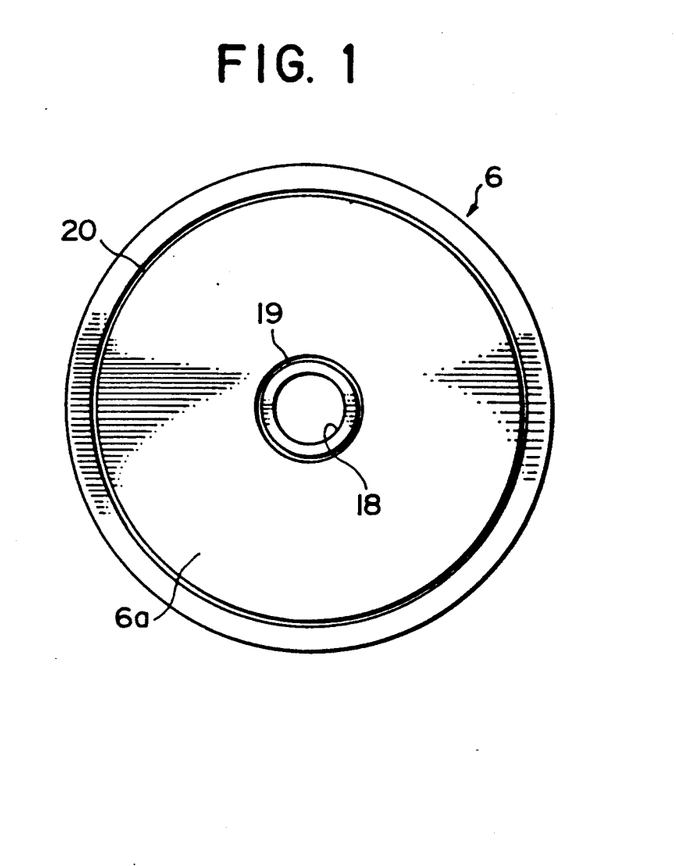
FIG. 1 is an enlarged plan view of a preferred embodiment of the glass substrate for an optical disk according to the present invention.
Figure 2:
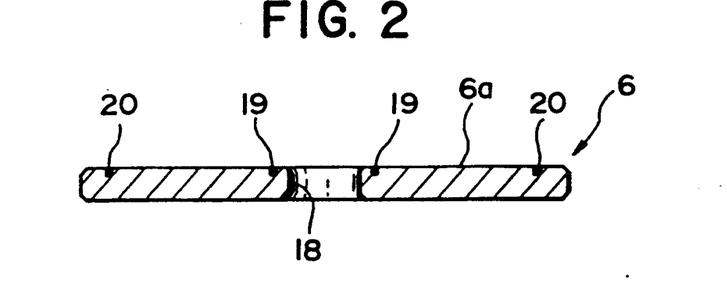
FIG. 2 is a sectional view of FIG. 1.

A glass substrate 6 of the preferred embodiment is a substrate for various optical disks inclusive of a digital audio disk and a magneto-optical disk. As shown in FIGS. 1 and 2, the glass substrate 6 is formed as a disk-shaped substrate having a center hole 18.

One surface 6a of the glass substrate 6 on which ultraviolet setting resin 9 is to be applied is formed with two escape recesses 19 and 20 for receiving an excess part of the ultraviolet setting resin 9 when the ultraviolet setting resin 9 applied to the surface 6a of the glass substrate 6 is brought into close contact with a stamper 10, and is pressed by a roller 12. The escape recess 19 is circularly formed in the vicinity of a circumferential edge of the center hole 18 of the glass substrate 6, and the escape recess 20 is also circularly formed in the vicinity of an outer circumferential edge of the glass substrate 6. Both the escape recesses 19 and 20 are concentric.

Figure 3A:
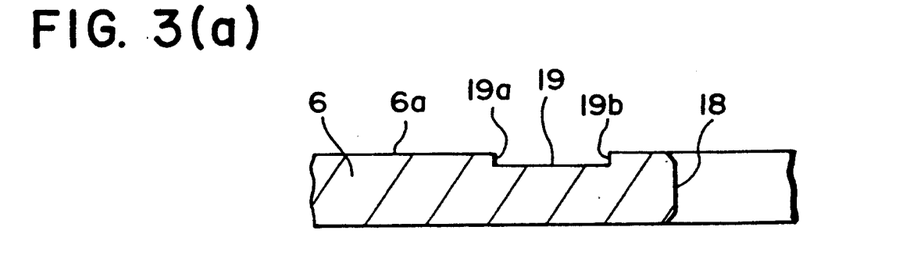
FIG. 3(a) shows a shape such that the opposite side walls of the recess are perpendicular to the surface of the glass substrate.
Figure 3B:
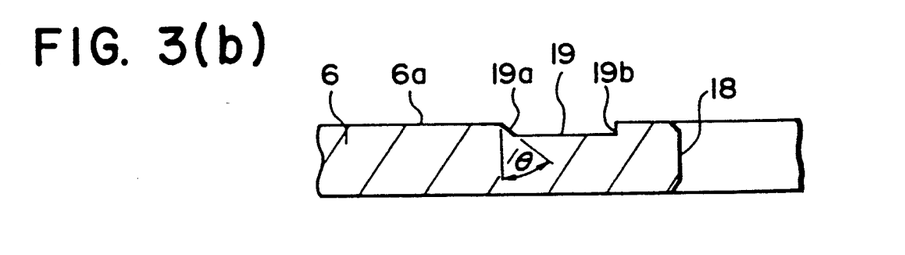
FIG. 3(b) shows a shape such that one of the opposite side walls is inclined.
Figure 3C:
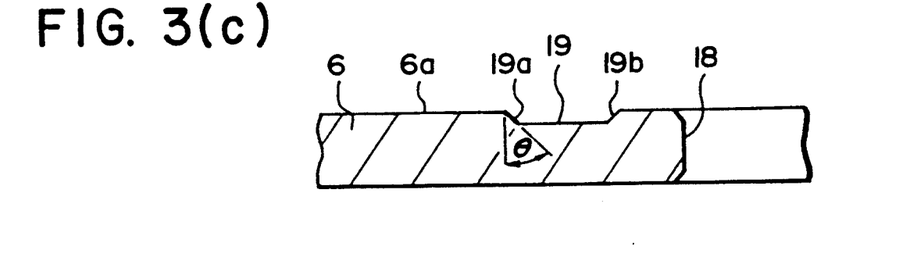
FIG. 3(c) shows a shape such that both the opposite side walls are inclined.
Figure 3D:
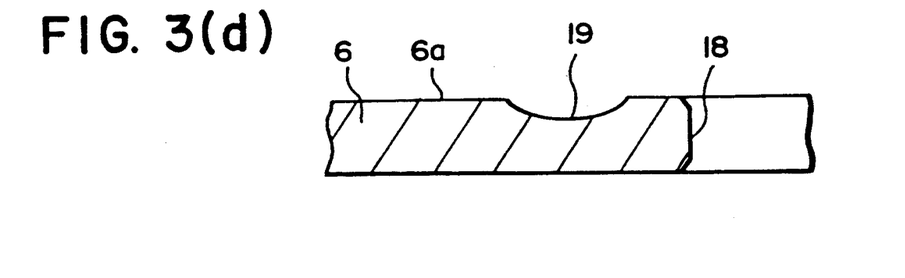
FIG. 3(d) shows an arcuate shape.

The shape of the escape recesses 19 and 20 is not especially limited, provided that they can receive the excess part of the ultraviolet setting resin. For instance, some preferred shapes of the recess 19 are shown in FIGS. 3(a) to 3(d). In the preferred shape shown in FIG. 3(a), the recess 19 has a rectangular cross section such that opposite side walls 19a and 19b are substantially perpendicular to the surface 6a of the glass substrate 6. In the preferred shape shown in FIG. 3(b), the recess 19 has a cross section such that the side wall 19a is inclined so as to gradually reduce the width of the recess 19. In the preferred shape shown in FIG. 3(c), the recess 19 has a cross section such that both the opposite side walls 19a and 19b are inclined so as to gradually reduce the width of the recess 19. In the preferred shape shown in FIG. 3(d), the recess 19 has an arcuate cross section. Above all, the shapes shown in FIGS. 3(b) and 3(c) are preferable since an excess part of the ultraviolet setting resin 9 can easily flow into the recess 19, thereby reliably receiving the excess part of the ultraviolet setting resin 9. Furthermore, the shapes shown in FIGS. 3(b) and 3(c) can be more easily obtained by machining than the shape shown in FIG. 3(a), thereby improving a productivity and extending a life of the recessing tool.

In the shapes shown in FIGS. 3(b) and 3(c), an inclined angle $\theta$ of the side walls 19a and 19b of the recess 19 is set to preferably 20°–80° in consideration of the easiness of flow of the ultraviolet setting resin 9 into the recess 19. Further, the above description regarding the shapes of the inner circumferential recess 19 can be of course applied to the outer circumferential recess 20. Moreover, although the recesses 19 and 20 are circularly formed in this preferred embodiment, they may be replaced by a plurality of arcuate recesses formed along the inner circumferential edge and the outer circumferential edge of the glass substrate 6.

The escape recesses 19 and 20 are formed by means of a diamond cutter or the like before the glass substrate 6 is subjected to a so-called chemical strengthening process in which Na contained in the glass substrate 6 is ion-exchanged to K in a molten salt. This is due to the fact that after the chemical strengthening process, the strength of the glass substrate 6 is increased so as to cause a difficulty of recessing, and further an internal stress of the glass substrate 6 is also increased to cause a possibility of breaking upon machining.

The width of the escape recesses 19 and 20 is decided according to the receiving capacity for excess ultraviolet setting resin and a room for a film forming area of recording film. For instance, the width is set to preferably about 0.5–2 mm. If the width is less than 0.5 mm, the excess ultraviolet setting resin cannot be sufficiently received. In contrast, if the width is more than 2 mm, the film forming area of the recording film becomes small. Further, the depth of the escape recesses 19 and 20 is decided in relation to the thickness of the glass substrate 6 from the viewpoint of the strength of the glass substrate 6. The depth is preferably set to a value such that the strength of the glass substrate 6 is ensured. For instance, in the case that the thickness of the glass substrate 6 is 1.175 mm, the depth is set to preferably about 0.2–0.3 mm. In this case, if the depth is more than 0.3 mm, the strength of the glass substrate 6 cannot be ensured.

Figure 4:
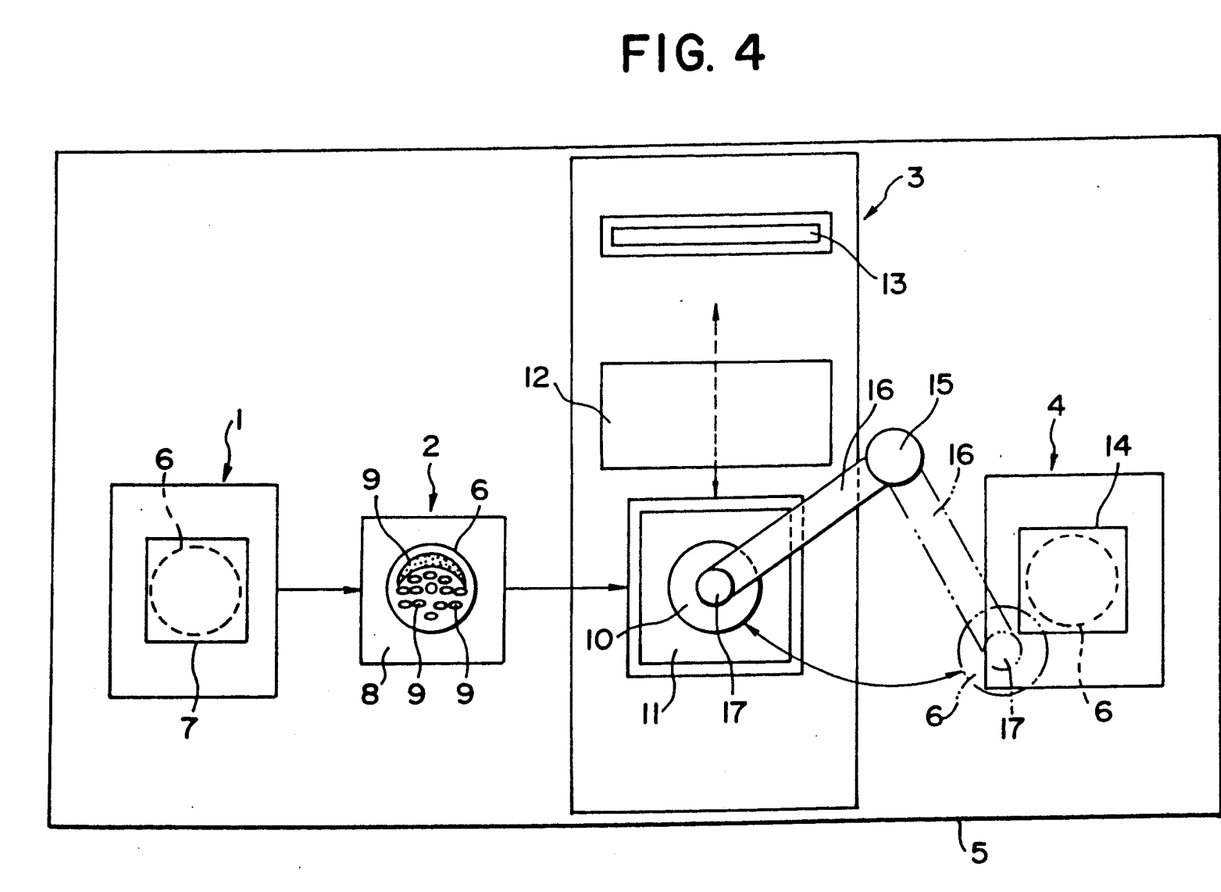
FIG. 4 is a schematic plan view of a preferred embodiment of the optical disk manufacturing apparatus for transferring the rugged pattern from the stamper to the glass substrate.

FIG. 4 shows an apparatus for manufacturing an optical disk using the above-mentioned glass substrate 6.

The manufacturing apparatus is so constructed as to continuously carry out a series of the steps of the 2P method. As shown in FIG. 4, this apparatus is comprised of an initial substrate stocking section 1 for stocking the glass substrate 6, a screen printing section 2 for applying the ultraviolet setting resin 9 onto the glass substrate 6 supplied from the initial substrate stocking section 1, a transferring section 3 for pressing the ultraviolet setting resin 9 on the glass substrate 6 against the stamper 10 and hardening the ultraviolet setting resin by ultraviolet irradiation to transfer the rugged pattern from the stamper 10 to the glass substrate 6, and a final substrate stocking section 4 for stocking the glass substrate 6 supplied from the transferring section 3. All of the initial substrate stocking section 1, the screen printing section 2, the transferring section 3 and the final substrate stocking section 4 are arranged on a base 5 in this order.

The initial substrate stocking section 1 is provided with a multi-stage cartridge 7 for temporarily accommodating a plurality of the glass substrates 6. The plural glass substrates 6 are supplied one by one from the cartridge 7 to the screen printing section 2.

The screen printing section 2 is provided with a printing bed 8 having a substrate placing portion for retaining the glass substrate 6 by means of vacuum chucking, and is further provided with a masking device and a squeegee for carrying out screen printing. In the screen printing section 2, the ultraviolet setting resin 9 in a liquid state is applied by screen printing to the surface 6a of the glass substrate 6 that had first been mechanically taken out from the cartridge 7 by a first moving mechanism (not shown).

The transferring section 3 includes the stamper 10 on which the inverted rugged pattern of pits and grooves is formed, a stamper holder 11 for retaining the stamper 10 which holder is movable forward and backward, a roller 12 normally located behind the stamper holder 11 for pressing the glass substrate 6 on which the ultraviolet setting resin 9 is applied against the stamper 10, and a light source 13 located behind the roller 12 for irradiating ultraviolet light to the ultraviolet setting resin 9 on the glass substrate 6 so as to harden the resin 9.

Although not shown, there is provided between the screen printing section 2 and the transferring section 3 a second moving mechanism for moving the glass substrate 6 from the screen printing section 2 to the transferring section 3 so as to invert the surface 6a of the glass substrate 6 on the printing bed 8 upside down and make the surface 6a in opposition to the stamper 10.

The final substrate stocking section 4 is provided with a multi-stage cartridge 14 similar to the cartridge 7 of the initial substrate stocking section 1. A third moving mechanism is provided between the transferring section 3 and the final substrate stocking section 4 to move the glass substrate 6 separated from the stamper 10 from the transferring section 3 to the cartridge 14 of the final substrate stocking section 4.

The third moving mechanism includes a rotating shaft 15, a rotating arm 16 adapted to be rotationally operated by the rotating shaft 15, and an adsorption head 17 provided at a free end of the rotating arm 16. The adsorption head 17 serves to adsorb the glass substrate 6 on the stamper 10 and move it from the transferring section 3 to the cartridge 14 of the final substrate stocking section 4.

The process of manufacturing the optical disk with use of the above apparatus will now be described.

First, plurality of glass substrates 6 are stocked in the cartridge 7 of the initial substrate stocking section 1.

Then, any one of the plurality of glass substrates 6 is moved from the cartridge 7 to the printing bed 8 of the screen printing section 2 by means of the first moving mechanism.

Figure 5A:
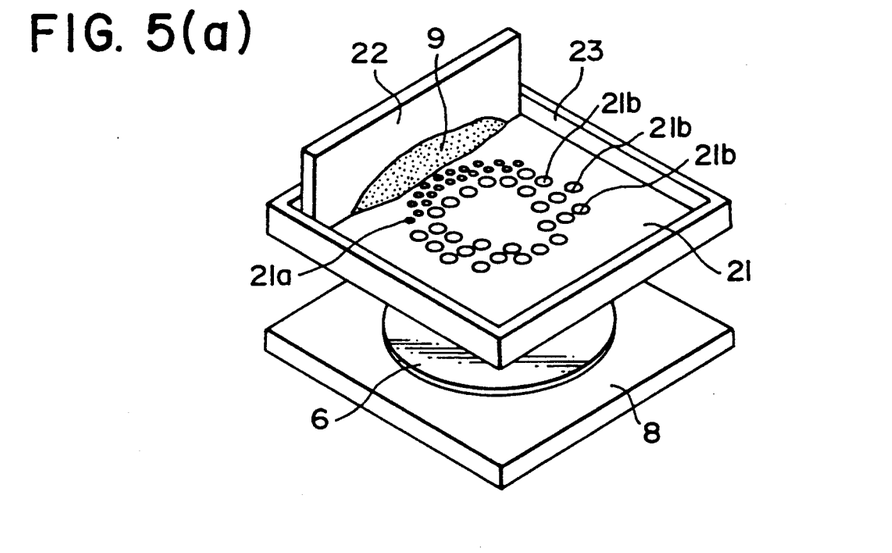
FIG. 5(a) is a schematic perspective view showing a screen printing step.

In the screen printing section 2, the ultraviolet setting resin 9 in a liquid state is soon applied to the glass substrate 6 placed on the printing bed 8 by means of a screen printing tool as shown FIG. 5(a).

The screen printing tool is primarily composed of a printing screen 21 formed of a thin stainless sheet having a predetermined opening pattern, and of a squeegee 22 for spreading the ultraviolet setting resin 9 over the printing screen 21. After the ultraviolet setting resin 9 is supplied onto the printing screen 21 surrounded by an outer peripheral frame 23, the resin 9 is spread over the printing screen 21 by means of the squeegee 22, thereby printing the ultraviolet setting resin 9 on the surface 6a of the glass substrate 6 according to the predetermined opening pattern of the printing screen 21.

In this preferred embodiment, the predetermined opening pattern of the printing screen 21 is primarily composed of a plurality of hexagonal openings 21a gathered so as to form a lunate shape and a plurality of circular openings 21b dispersed so as to form a pattern extending along the lunate pattern of the hexagonal openings 21a and avoiding a portion corresponding to the center hole 18 of the glass substrate 6. With this construction, it is possible to prevent the spewing of the ultraviolet setting resin 9 and the generation of bubbles in the next step of pressing the glass substrate 6 against the stamper 10.

Figure 6:
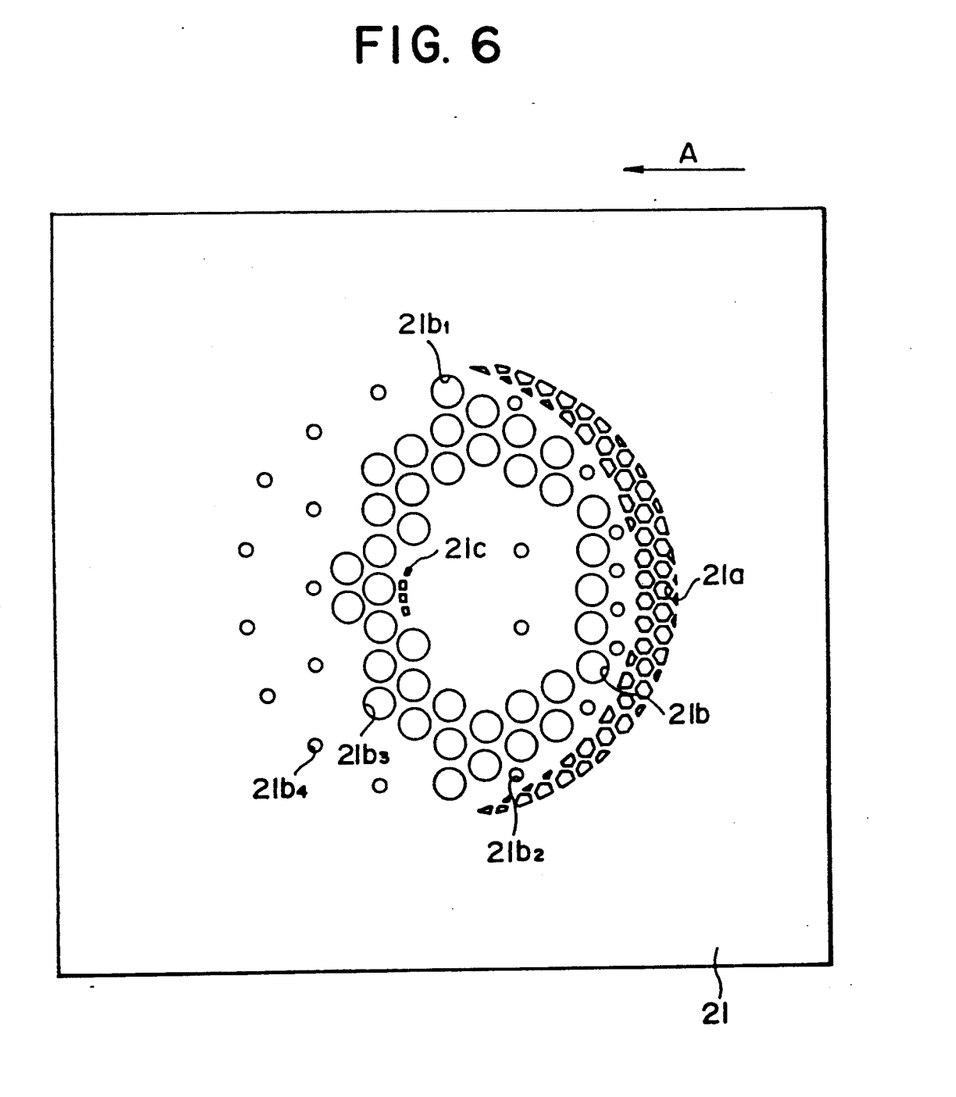
FIG. 6 is a plan view showing the opening pattern formed through the printing screen.

FIG. 6 shows the detail of the predetermined opening pattern of the printing screen 21. Referring to FIG. 6, an arrow A denotes a direction of relative movement of the roller 12 to the glass substrate 6 (actually, the glass substrate 6 placed on the stamper holder 11 is moved relative to the roller 12 fixed in position). In a semicircular area of the screen 21 where a part of the predetermined opening pattern is formed on the pressure start side by the roller 12 (i.e., an area of the screen 21 corresponding to a portion of the glass substrate 6 to be initially pressed by the roller 12 in the step of pressing the glass substrate 6 against the stamper 10), the lunate pattern of the hexagonal openings 21a is formed at a position along the outer circumferential edge of the glass substrate 6. Further, a first pattern of plural circular openings $21b_1$ and a second pattern of plural circular openings $21b_2$ smaller than the circular openings $21b_1$ are formed along the lunate pattern so as to avoid the peripheral area of the center hole 18 of the glass substrate 6. In another semicircular area of the printing screen 21 where the remaining part of the predetermined opening pattern is formed on the pressure end side by the roller 12, an arcuate pattern of fine openings 21c for supplementing the resin is formed along the peripheral area of the center hole 18 of the glass substrate 6. Further, a third pattern of plural circular openings $21b_3$ is arcuately formed outside the arcuate pattern of the fine openings 21c, and a fourth pattern of plural circular openings $21b_4$ smaller than the circular openings $21b_3$ is also arcuately formed outside the third pattern of the circular opening $21b_3$ so as to avoid the outer circumferential edge of the glass substrate 6.

With use of this printing screen 21 having the above-mentioned opening pattern, it is possible to prevent the generation of strain of the printing screen 21 and ensure stable printing of the ultraviolet setting resin 9. Further, it is also possible to prevent the spewing of the ultraviolet setting resin 9 upon pressing by the roller 12.

Thus, the ultraviolet setting resin 9 can be desirably printed on the surface 6a of the glass substrate 6 according to the opening pattern of the printing screen 21.

Figure 5B:
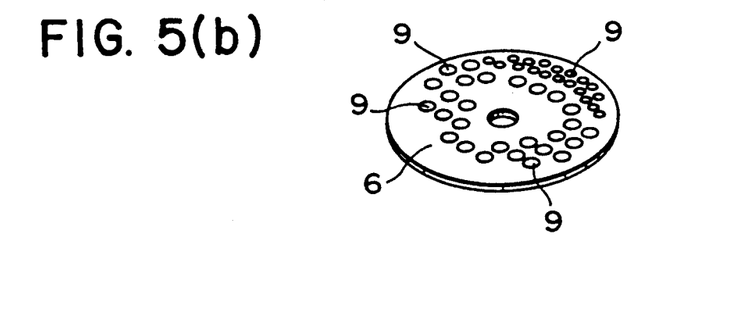
FIG. 5(b) is a schematic perspective view showing the glass substrate on which the ultraviolet setting resin is printed.

The glass substrate 6 on which the ultraviolet setting resin 9 has been screen-printed in the above-mentioned manner is shown in FIG. 5(b).

Then, the glass substrate 6 is moved from the screen printing section 2 to the transferring section 3, so as to transfer the rugged pattern of the stamper 10 to the ultraviolet setting resin 9 on the glass substrate 6.

Figure 5C:
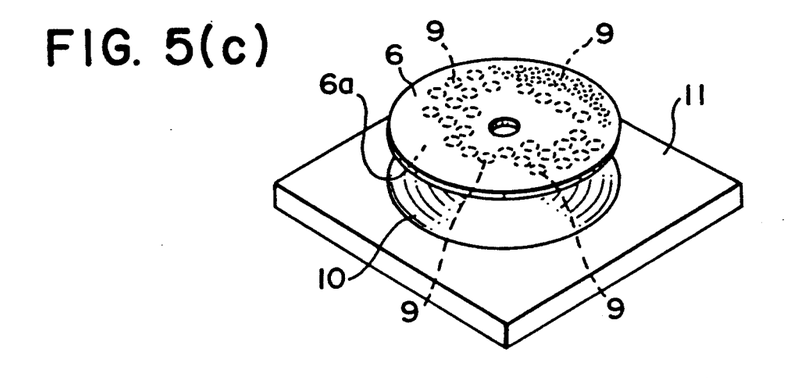
FIG. 5(c) is a schematic perspective view showing a step of superimposing the glass substrate onto the stamper.

In moving the glass substrate 6 to the transferring section 3, the glass substrate 6 is inverted upside down, and is then placed on the stamper 10 retained by the stamper holder 11 so that the surface 6a of the glass substrate 6 on which the ultraviolet setting resin 9 is printed is brought into superimposition on the stamper 10.

Figure 5D:
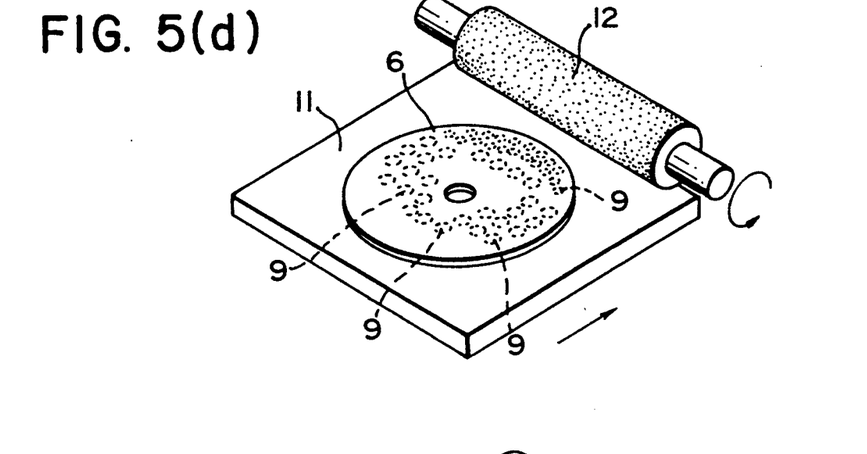
FIG. 5(d) is a schematic perspective view showing a step of pressing the glass substrate by means of the roller.

In the transferring section 3, the glass substrate 6 superimposed on the stamper 10 is moved by moving the stamper holder 11 to the position of the roller 12. Then, the glass substrate 6 is pressed by the roller 12 as shown in FIG. 5(d), thus coming into close contact with the stamper 10.

As a result, the ultraviolet setting resin 9 on the glass substrate 6 is pressed by the roller 12, and is thereby forced into the fine rugged pattern of the stamper 10 uniformly and compactly. At this time, since the escape recesses 19 and 20 for receiving an excess part of the ultraviolet setting resin 9 are formed in the vicinity of the inner circumferential edge and the outer circumferential edge of the glass substrate 6, the excess part of the ultraviolet setting resin 9 is allowed to flow into the escape recesses 19 and 20. Accordingly, the ultraviolet setting resin 9 is prevented from spewing at the inner circumferential edge and the outer circumferential edge of the glass substrate 6.

Figure 5E:
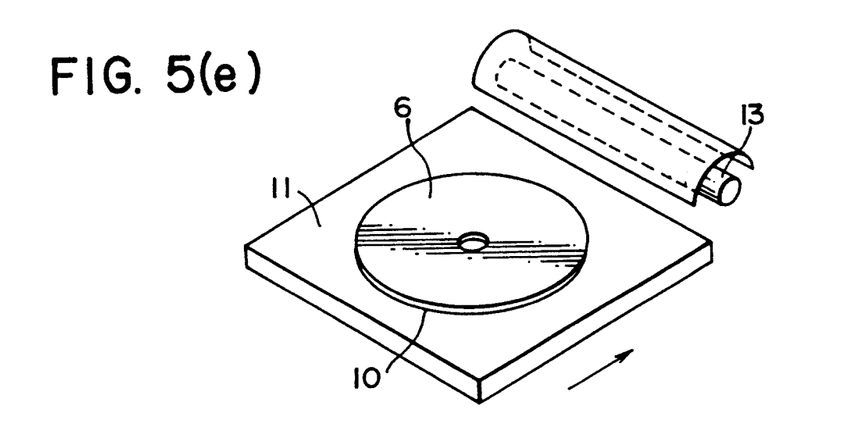
FIG. 5(e) is a schematic perspective view showing a ultraviolet light irradiation step.

Thereafter, the stamper holder 11 is further moved to the position of the light source 13 to locate the glass substrate 6 closely contacting the stamper 10 under the light source 13 as shown in FIG. 5(e).

Under the condition, ultraviolet light is irradiated from the light source 13 to the glass substrate 6. As a result, the ultraviolet setting resin 9 interposed between the glass substrate 6 and the stamper 10 is hardened by photopolymerization. At this time, since the ultraviolet setting resin 9 has not been spewed at the inner circumferential edge and the outer circumferential edge of the glass substrate 6, no spewed resin 9 is hardened to thereby cause the generation of a bur.

In this manner, the rugged pattern formed on the surface of the stamper 10 is invertedly transferred to the layer of the ultraviolet setting resin 9 on the glass substrate 6.

Figure 5F:
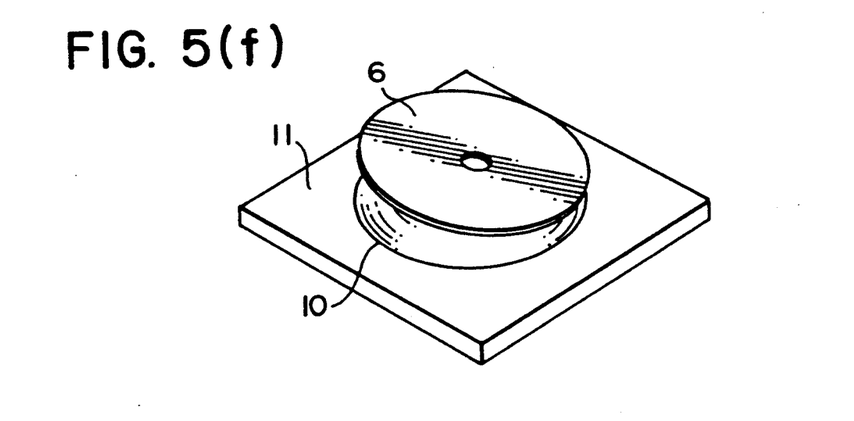
FIG. 5(f) is a schematic perspective view showing a step of separating the glass substrate from the stamper.

After transferring the rugged pattern, the glass substrate 6 is separated from the stamper 10 as shown in FIG. 5(f), and is then moved to the final substrate stocking section 4 by means of the third moving mechanism. Then, the glass substrate 6 is stocked in the cartridge 14 of the final substrate stocking section 4.

Thereafter, a desired functional film is formed on the layer of the ultraviolet setting resin 9 on the glass substrate 6 to thereby obtain the optical disk such as a digital audio disk or a magneto-optical disk.

For instance, in the case of obtaining the digital audio disk or a so-called CD-ROM, a metal reflection film such as an Al film is formed on the layer of the ultraviolet setting resin 9 having the rugged pattern. On the other hand, in the case of obtaining the magneto-optical disk, a vertical magnetization film such as a TbFeCo film having a magneto-optical characteristic (Kerr effect or Faraday effect) is used.

As apparent from the above description, the present invention is characterized in that the escape recess for receiving the ultraviolet setting resin is formed in the vicinity of the inner circumferential edge and/or the outer circumferential edge of the glass substrate. Accordingly, any excess part of the ultraviolet setting resin upon pressing the same against the stamper can be trapped by the escape recess to thereby prevent the spewing of the ultraviolet setting resin.

Accordingly, the generation of a bur at the inner circumferential edge and/or the outer circumferential edge of the glass substrate can be reliably prevented to greatly improve the yield.

We claimed as our invention:

1. An optical information recording medium comprising:
   a disk shaped glass substrate having a center hole, and an annular recess formed in the vicinity of at least one of an outer circumferential edge and an inner circumferential edge of said glass substrate, wherein said annular recess has a width of substantially 0.5 to 2.0 mm and a depth of substantially 0.2 to 0.3 mm;
   an ultraviolet ray hardened resinous layer formed on said substrate;
   an edge area of said ultraviolet ray hardened resinous layer being substantially terminated at said annular recess formed in the vicinity of at least one of said outer circumferential edge and inner circumferential edge; and
   optical information formed on said resinous layer.

2. An optical information recording medium according to claim 1, wherein a surface of said resinous layer away from said substrate is formed with a plurality of pregrooves.

3. An optical information recording medium according to claim 1, wherein the surface of said glass substrate is hardened by partial exchange of Na ions to K ions.

4. An optical information recording medium according to claim 1, wherein a first concentric annular recess is formed in the vicinity of the outer circumferential edge and a second concentric annular recess is formed in the vicinity of the inner circumferential edge around said center hole.

5. An optical information recording medium according to claim 4, wherein said first and second recesses are formed with side walls at angles to a surface of said substrate.

6. An optical information recording medium comprising:
   a glass disk substrate having a center hole and at least one annular recess formed in the vicinity of an inner circumferential edge surrounding said center hole, wherein said annular recess has a width of substantially 0.5 to 2.0 mm and a depth of substantially 0.2 to 0.3 mm;
   an ultraviolet ray hardened resinous layer formed on said substrate;
   an inner edge area of said ultraviolet ray hardened resinous layer being substantially terminated at said annular recess; and
   optical information formed on said resinous layer.

7. An optical information recording medium comprising:
   a glass disk substrate having a center hole and a first annular recess formed in the vicinity of an outer circumferential edge of said substrate and a second annular recess formed in the vicinity of an inner circumferential edge of said substrate surrounding said center hole, wherein said first and second annular recesses have a width of substantially 0.5 to 2.0 mm and a depth of substantially 0.2 to 0.3 mm;
   an ultraviolet ray hardened resinous layer formed on said substrate between said first and second annular recesses;
   edge areas of said ultraviolet ray hardened resinous layer substantially terminating at said first and second annular recesses; and
   optical information being formed on resinous layer.

* * * * *